2 Sheets--Sheet 1.

W. B. SCAIFE.
Iron Vaults and Cells.

No. 148,762.   Patented March 17, 1874.

Witnesses.  
Wm. W. L. Dyre.  
James I. Johnston.

Inventor.  
W B Scaife

2 Sheets--Sheet 2.

W. B. SCAIFE.
Iron Vaults and Cells.

No. 148,762. Patented March 17, 1874.

Witnesses. Inventor.
Wm. W. S. Dyre. W. B. Scaife
James J. Johnston

UNITED STATES PATENT OFFICE.

WILLIAM B. SCAIFE, OF PITTSBURG, PENNSYLVANIA.

IMPROVEMENT IN IRON VAULTS AND CELLS.

Specification forming part of Letters Patent No. 148,762, dated March 17, 1874; application filed September 3, 1873.

*To all whom it may concern:*

Be it known that I, WILLIAM B. SCAIFE, of Pittsburg, in the county of Allegheny and State of Pennsylvania, have invented a new and useful Improvement in Vaults, Safes, and Prison-Cells; and I do hereby declare that the following is a full, clear, and exact description thereof, reference being had to the accompanying drawings and to the letters of reference marked thereon.

My invention relates to an improvement in vaults, safes, and cells for prisons; and consists in constructing the walls of the vault, safe, or cell of plate iron or steel, and interposing between the plates, at the points of juncture, a bar of iron or steel having concave sides for receiving the curved edges of the plates, which are riveted or bolted to said bar so that the heads of the rivets, or the heads and nuts of the bolts, are on the exterior of the vault, safe, or cell, and protected by a tubular guard. The object of my invention is the construction of the walls of vaults, safes, or cells for prisons so that it is impossible for burglars to insert and manipulate a saw or other tool for the purpose of cutting the rivets or bolts and open the joints of the vault, safe, or cell.

To enable others skilled in the art to make and use my invention, I will proceed to describe more fully its construction and operation.

Figure 1:
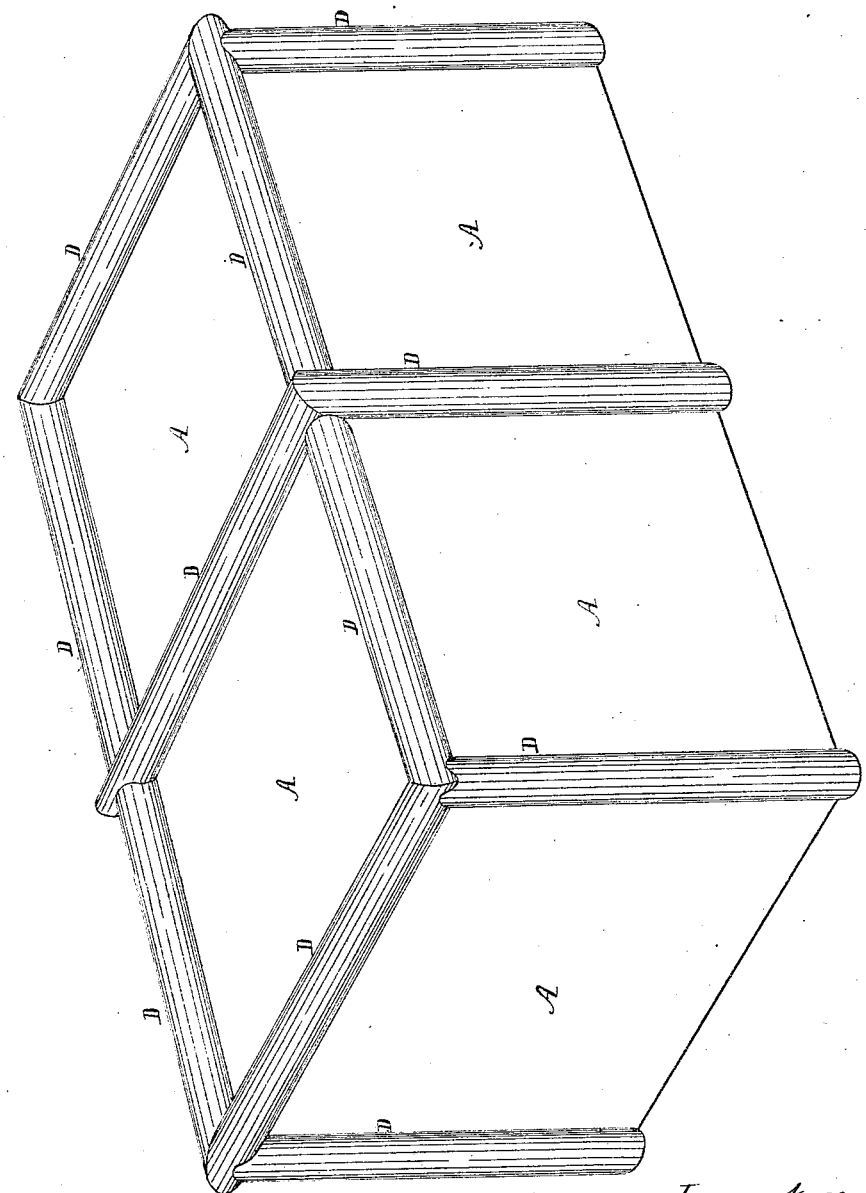
Figure 2:
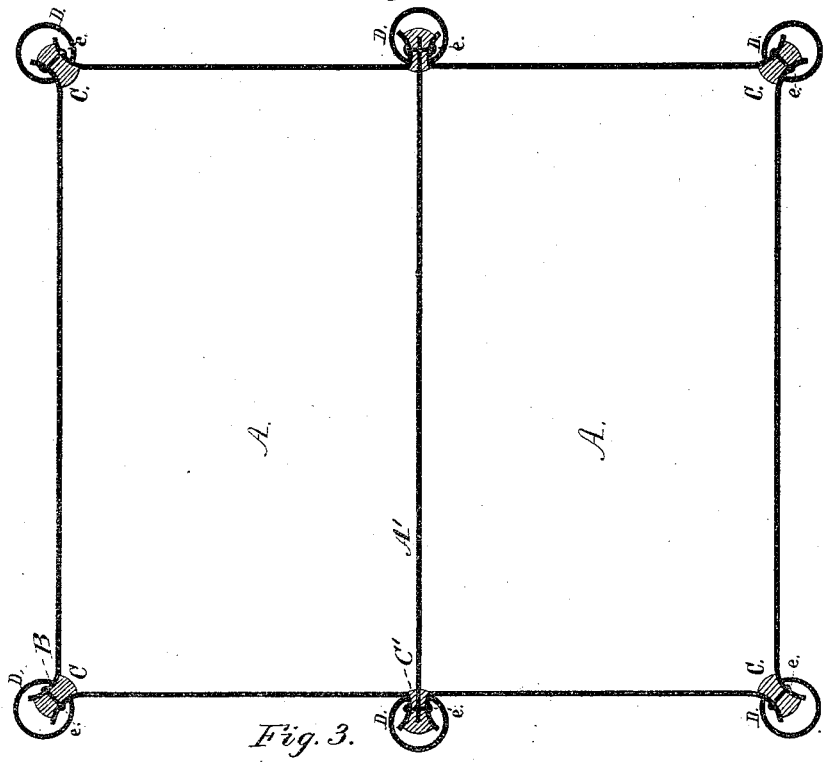
Figure 3:
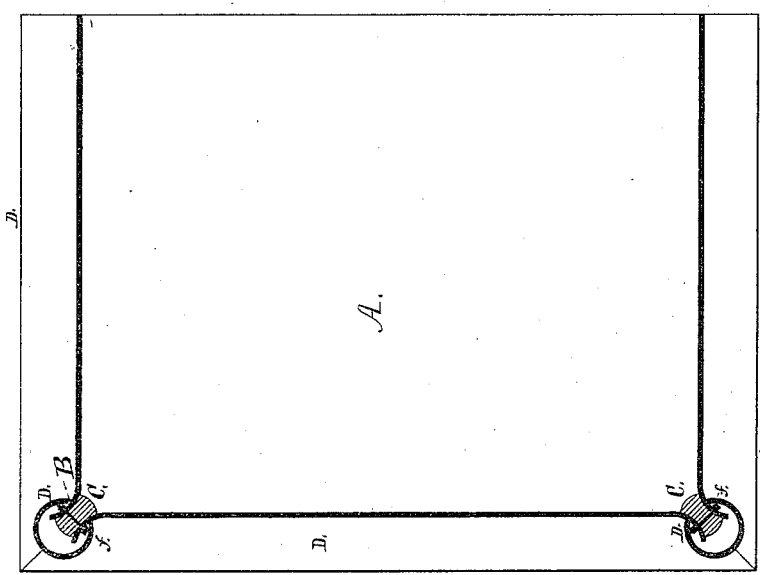

In the accompanying drawings, which form part of my specification, Figure 1, Sheet 1, is a perspective view of my improvement in vaults, safes, and prison-cells. Fig. 2, Sheet 2, is a horizontal section of the same. Fig. 3, Sheet 2, is a vertical section of the same.

The plates A may be constructed of plate iron or steel, and of any desired thickness or size. The plates near their edges are provided with suitable openings for the rivets or bolts, and are curved, as indicated at B. The bars C are provided with concave sides for the reception of the curved edges B of the plates A. The bars C are also furnished with openings for the rivets or bolts, and these openings correspond in form, size, number, and position to the openings in the curved part B of the plates. The plates A and bars C being constructed as hereinbefore described, they are then secured together by means of rivets, as indicated at *e* in Fig. 2, or by bolts, as indicated at *f* in Fig. 3. After the plates are secured together the rivets or bolts and the outer part of the joints are protected by the tubular guards D, the construction and application of which are clearly shown in the accompanying drawings.

When prison-cells are constructed as set forth in the foregoing description, the door and window or windows may be cut in the plate A, and the door for the vault or safe made in like manner.

The partition-wall in the prison-cell is formed by the edges of the plate A′ entering a recess in the bars C′, as shown in Fig. 2, the construction of which will be readily understood by the skillful mechanic without further description.

The joints in the walls of vaults, safes, or cells, when constructed as hereinbefore described, will be impenetrable and proof against the tools of burglars or of prisoners confined within the walls of the cell.

Having thus described the nature, object, construction, and advantages of my improvement, what I claim as my invention is—

1. A vault, safe, or cell for prisons, constructed of plate iron or steel, the edges of the plates curved and a bar of iron or steel interposed between them, substantially as herein described, and for the purpose set forth.

2. The bar C′, provided with a groove, in combination with the partition-plate A′ and the curved edges B of the plates A, substantially as herein described, and for the purpose set forth.

3. The tubular guard D, in combination with the curved edges B of the plates A and bar C, substantially as herein described, and for the purpose set forth.

4. In combination with the curved edges B of the plates A, the bar C′, plate A′, and guard D, substantially as herein described, and for the purpose set forth.

W. B. SCAIFE.

Witnesses:
 JAMES J. JOHNSTON,
 EDM. T. BROWN.